(12) United States Patent
Naitoh et al.

(10) Patent No.: US 7,225,086 B2
(45) Date of Patent: May 29, 2007

(54) ALTERNATING-SOURCE PEAK-SHIFT POWER APPLICATION SYSTEM, METHOD AND PROGRAM PRODUCT

(75) Inventors: Arimasa Naitoh, Fujisawa (JP);
Shigefumi Odaohhara, Yamato (JP)

(73) Assignee: Lenovo Singapore Pte. Ltd, Singapore (SG)

( * ) Notice: Subject to any disclaimer, the term of this patent is extended or adjusted under 35 U.S.C. 154(b) by 166 days.

(21) Appl. No.: 10/932,831

(22) Filed: Sep. 2, 2004

(65) Prior Publication Data
US 2005/0057224 A1 Mar. 17, 2005

(30) Foreign Application Priority Data
Sep. 9, 2003 (JP) ............................ 2003-317273

(51) Int. Cl.
*G06F 19/00* (2006.01)
(52) U.S. Cl. .................... 702/57; 702/60; 702/104; 320/134; 320/162; 320/105; 307/39; 323/284; 713/320; 324/103
(58) Field of Classification Search .................. 702/57, 702/60, 63–64, 104, 189; 320/134, 106, 320/112, 162, 105; 307/39; 323/284; 713/320; 324/103
See application file for complete search history.

(56) References Cited

U.S. PATENT DOCUMENTS 5,282,054 A * 1/1994 Oana et al. ................. 358/406
2002/0099962 A1* 7/2002 Nakamura ................... 713/300
2003/0090236 A1* 5/2003 Odaohhara et al. ......... 320/134
2003/0098679 A1* 5/2003 Odaohhara .................. 323/284
2003/0188210 A1* 10/2003 Nakazato .................... 713/320
2003/0205995 A1* 11/2003 Odaohhara et al. ..... 324/103 R

FOREIGN PATENT DOCUMENTS

JP 2000-029576 1/2000
JP 2003-150281 5/2003

* cited by examiner

*Primary Examiner*—Carol S. W. Tsai
*Assistant Examiner*—Elias Desta
(74) *Attorney, Agent, or Firm*—Kunzler & McKenzie; Carlos Munez-Bustamante

(57) ABSTRACT

Apparatus includes a main body having a function of reducing performance of the apparatus during operation, an AC adapter which is connectable to the main body and supplies power to the main body from a commercial power source, and a rechargeable battery which is connectable to the main body and discharges to supply power to the main body. Apparatus operates without reducing the performance even while the power supplied from the AC adapter is turned off and the power is supplied from the battery during a peak shift period (e.g. mid-day summer where limiting the power supplied by the AC adapter is desirable) in a state where both the AC adapter and the battery are connected to the main body, and thereafter, the power supplied from the AC adapter is turned on and power is supplied to the main body from the AC adapter even during the peak shift period.

18 Claims, 7 Drawing Sheets

ALTERNATING-SOURCE PEAK-SHIFT POWER APPLICATION SYSTEM, METHOD AND PROGRAM PRODUCT

BACKGROUND OF THE INVENTION

The present invention relates to electrical equipment such as a computer apparatus, and more specifically, to electrical equipment configured such that a power supply source such as an AC adapter and a battery which discharges after being charged are connectable thereto.

In various types of electrical equipment including information terminal equipment, represented by a notebook-type personal computer (notebook PC), personal equipment such as a PDA (Personal Digital Assistant), various types of portable audio equipment, a video camera, and the like, part of the time that the equipment receives a supply of power from a battery (a storage battery, a secondary battery or a battery) that is used over and over again while repeating charge and discharge, and a part of the time that the equipment receives power directly from a commercial power source through, for example, an AC adapter. A nickel hydrogen battery (NiMH battery) and a nickel cadmium battery, each of which has a relatively large capacity and is inexpensive, may be used as such a battery. Moreover, in some cases, the battery may be a lithium ion battery, in which energy density per unit weight is higher as compared with that of the nickel cadmium battery, a lithium polymer battery using solid polymer electrolyte instead of using liquid electrolyte, and the like.

Such electrical equipment, for example, the notebook PC, is sometimes configured such that both the AC adapter and the battery can be connected to a main body of a system thereof. In such a case, voltage of the AC adapter is higher as compared with voltage of the battery, and accordingly, power is supplied from the AC adapter to the system when both the AC adapter and the battery are connected thereto. In general, it is only in a case where the AC adapter is detached from the main body or a power supply path from the AC adapter is blocked by means of a switch or the like that the battery is used as a drive power source. Moreover, in a case where the AC adapter is connected to the main body, the battery is automatically charged by the AC adapter. For this reason, when the AC adapter is connected to the main body of the system, a large amount of power is constantly supplied thereto from the commercial power source.

Meanwhile, in recent years, "peak shift" has been studied to reduce peak power during a time such as a summer afternoon, when a demand for power is extremely large since power consumption rapidly increases due to, for example, use of air conditioners (for example, one o'clock through four o'clock during a daytime). Moreover, in Japan, a power expense at night is less expensive as compared with that in the daytime, and it has been requested to limit a supply of power from the commercial power source in the daytime.

For the subject described above, conventional technology exists which enables automatic switching between the AC drive and the battery drive in response to a time setting, thereby achieving effective utilization of power (for example, refer to Patent Document 1). Moreover, the applicants of the present invention have proposed a technology of optimizing power consumption. In this technology, together with a drive mode by the battery and a drive mode by the AC adapter, a dual mode of supplying power from both of the sources is provided as a power supply mode. Moreover, the invention allows selection of a source of power supplied to each subsystem depending on whether or not the battery can last until a shutdown time of stopping the supply of power from the AC adapter (for example, refer to Patent Document 2).

[Patent Document 1] Japanese Patent Laid-Open No. 2000-29576 (pp. 5-6, FIG. 2)

[Patent Document 2] Japanese Patent Laid-Open 2003-150281 (pp. 6-7, FIG. 2)

Moreover, for example, in the notebook PC, there is a power management function of limiting power consumption of the main body of the system. In a reduction operation of the power consumption by this power management function, for example, the operating speed of a CPU is reduced. One way to reduce operation speed of the CPU, for example, is so-called throttling, in which ON/OFF operation of the CPU is repeated to decrease apparent clock frequency. Another example of a way to reduce operating speed of the CPU is the Intel SpeedStep (registered trademark) Technology of the Intel Corporation, which is a technology of decreasing clock frequency of the CPU and the voltage supplied thereto. For example, when the notebook PC is driven by the battery, a power management for limiting discharge power is executed in order to prevent a temperature rise of a battery pack in which the battery is built.

Today, for example, there are notebook PCs installed with power-consuming, high-performance CPUs. At the same time, there are notebook PCs which support the peak shift function by utilizing technologies in the aforementioned Patent Documents 1 and 2. However, since each notebook PC is driven by a battery during the peak shift period, the aforementioned power management function limits the operation speed of the system to approximately, for example, 50% (lithium ion battery) or 37% (nickel hydrogen battery). Although portability is important in the notebook PCs, users use the notebook PCs in a similar manner to desktop PCs. Thus, the users naturally expect full-performance of the notebook PCs. However, in the case where the power management function works automatically, the operation speed of the CPU must be reduced upon power supply from a battery in the actual situation. This happens because, for example, the operation for reducing power consumption to prevent a temperature rise. Therefore, the notebook PCs do not sufficiently meet the demands of the users.

SUMMARY OF THE INVENTION

The present invention has been created in order to solve the technical problems as described above. It is a purpose of the present invention to sufficiently increase performance of a main body of a system, for example, even during a peak shift period.

It is another purpose of the present invention to maintain a period while the system is being driven mainly by a battery. For example, the period may be the peak shift period for a sufficient time.

To achieve the purposes, electrical equipment to which the present invention is applied includes a main body, an external power source, a battery and a controller. The main body consumes power. The external power source supplies power to the main body from a commercial power source. The battery discharges to supply power to the main body after being charged. The controller alternately switches the power supply source between the battery and the external power source for the main body during a predetermined period.

Herein, the predetermined period can be characterized by being a period while a power supply from the external power source is limited, for example, a peak shift period. If the controller is characterized by switching between the battery and the external power source in a certain cycle repeated during the predetermined period, the controller preferably operates the electrical equipment in a high performance state where the temperature rise in the battery is suppressed to a predetermined state. Moreover, the controller can be characterized by calculating an amount of power supplied to the main body by the battery in a certain cycle repeated during the predetermined period, and switching the power supply source for the main body from the battery to the external power source based on the calculated amount of power.

From another viewpoint, the present invention is electrical equipment to which an external power source supplying power to a main body from a commercial power source and a battery discharging to supply power to the main body are connected, the electrical equipment including first switching means, second switching means, and third switching means. The first switching means turns off the power supply from the external power source to supply the power to the main body from the battery in response to reaching a first time. The second switching means turns on the power supply from the external power source to supply the power to the main body from the external power source in response to reaching a second time after the first time. The third switching means repeats the turning off/on of the power supply from the external power source to the main body a plurality of times during a period between the first time and the second time.

Here, the third switching means is characterized by executing the turning off/on of the power supply from the external power source during a predetermined cycle. Moreover, the third switching means can be characterized by turning on the power supply from the external power source based on a total amount of power per cycle determined on a basis of allowable temperature of the battery.

Meanwhile, a computer apparatus to which the present invention is applied includes a main body of a system, an AC adapter, and a battery. The main body of a system has a function of reducing performance of the system to operate. The AC adapter is configured to be connectable to the main body of the system and supplies power to the main body of the system from a commercial power source. The battery is configured to be connectable to the main body of the system and discharges to supply power to the main body of the system after being charged. The computer apparatus is characterized by operating the system without reducing the performance of the system even while the power supply from the AC adapter is turned off and the power is supplied from the battery during a period of limiting the power supply from the AC adapter in a state where both the AC adapter and the battery are connected to the main body of the system, and thereafter, the power supply from the AC adapter is turned on and the power is supplied to the main body of the system from the AC adapter even during the above period.

Moreover, the computer apparatus can be characterized in that the power supply from the battery and the power supply from the AC adapter are switched during a predetermined cycle in the above period. Furthermore, the computer apparatus can be characterized in that a total amount of power when the battery discharges during this predetermined cycle is calculated, and the power supply is switched to the power supply from the AC adapter before the total amount of power exceeds an amount of power determined based on specifications of the battery.

From still another viewpoint, the present invention is a method of supplying power to electrical equipment to which both an external power source supplying power from a commercial power source and a battery discharging to supply power are connected, the method including: (a) in response to reaching a first time, stopping a power supply from the external power source to supply the power from the battery; (b) grasping a state of the power supply from the battery after the first time; and (c) switching to the power supply from the external power source when the power supply from the battery reaches a predetermined state. The method is characterized in that the step (b) and step (c) are repeated in a predetermined cycle.

Here, the step (a) can be characterized by not reducing performance of a system of the electrical equipment when the power is supplied from the battery. Moreover, the predetermined state grasped in the step (b) can be characterized by being an elapse of time obtained by delimiting the predetermined cycle by a predetermined ratio. Furthermore, the predetermined state grasped in the step (b) can be characterized by being a summed value of amounts of power discharged from the battery.

Note that these inventions can be understood as a program realized by a computer which is configured such that an external power source supplying power to a system from a commercial power source and a battery discharging to supply power to the system are connectable thereto. In the event of providing this program to the computer, for example, in addition to the case where the program is provided by being installed in a notebook PC, the program which is executed by the computer may be stored in a computer readable storage medium. For example, DVD and CD-ROM media apply to such a storage medium. The program is read by DVD and CD-ROM readers, stored in a flash ROM and the like, and then executed. Moreover, for example, the program may be provided through a network by a program transmission device.

More concretely, the program to which the present invention is applied allows the computer to realize a function of turning off the power supply from the external power source to supply the power to the system from the battery in response to reaching a first time, a function of turning on the power supply from the external power source to supply the power to the system from the external power source in response to reaching a second time after the first time, and a function of repeating the turning off/on of the power supply from the external power source to the system a plurality of times during a period between the first time and the second time.

Here, the program can further allow the computer to realize a function of operating the system without reducing performance of the system when the external power source is turned off and the power is supplied from the battery to the system. Moreover, the function of repeating the turning off/on of the power supply from the external power source a plurality of times can be characterized by executing the turning off/on for each predetermined time in a predetermined cycle or to control, at a predetermined value, average discharge power from the battery in the above cycle.

In addition, a program to which the present invention may be applied allows a computer to be described below to realize a function of, in a state where the external power source is connected to the computer, turning off the power supply from the external power source to supply the power from the battery to the system, and operating the system with the usual performance without reducing the performance of the system, and a function of turning back on the external power supply after a predetermined period in a certain cycle to supply the power from the external power source to the system. The aforementioned computer is configured such that an external power source supplying power to a system from a commercial power source and a battery discharging to supply power to the system are connectable thereto, and has a function of operating with usual performance when the power is supplied from the external power source to the system and reducing performance of the system when the external power source is not connected to the computer but the power is supplied from the battery to the system.

According to the present invention, it is made possible to sufficiently increase the performance of the electrical equipment, for example, even during the peak shift period.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, note that like numerals indicate like elements or steps throughout the several views.

Figure 1:
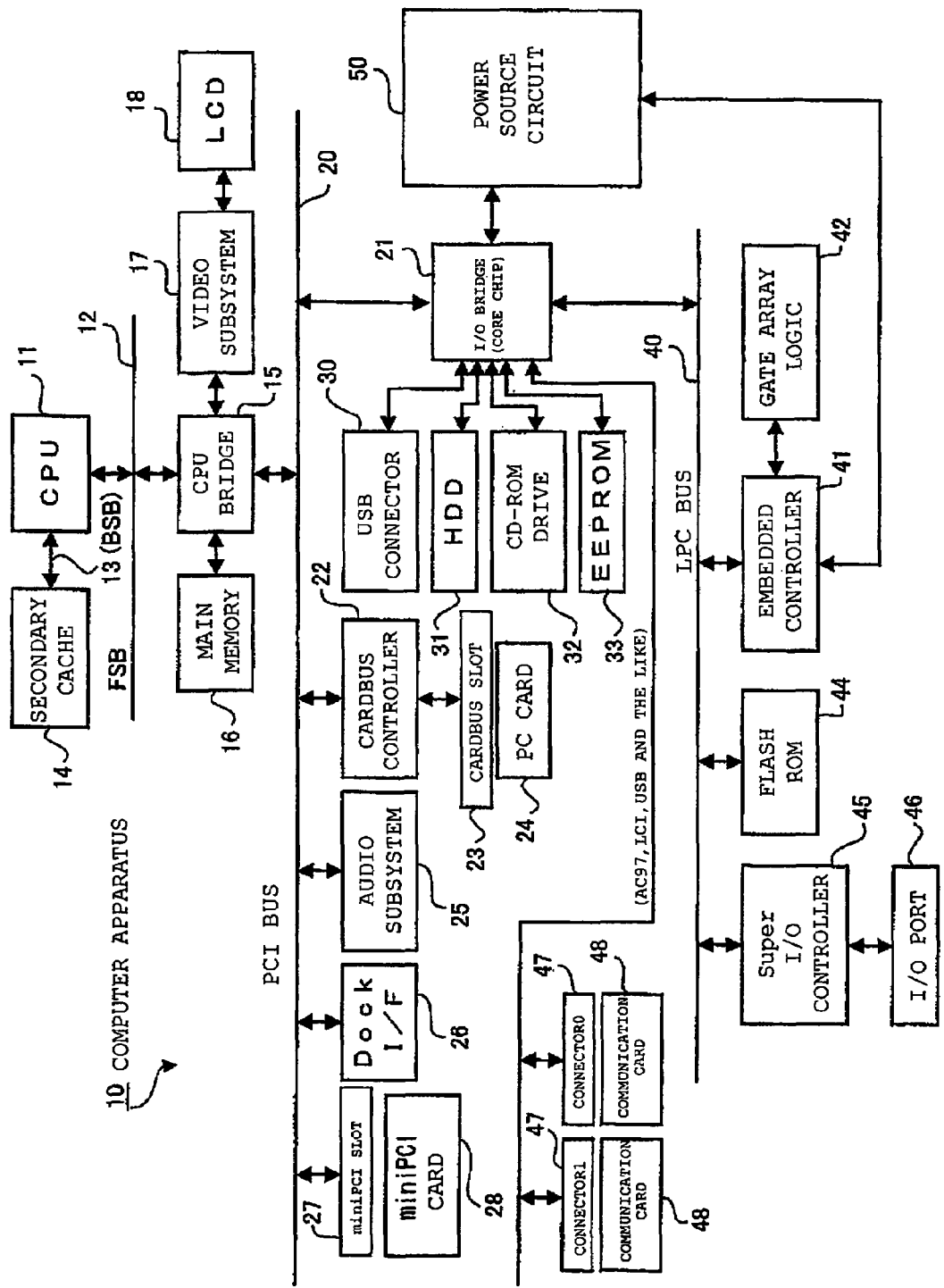
FIG. 1 is a diagram showing a hardware configuration of a computer apparatus such as a notebook PC (notebook type personal computer).

FIG. 1 is a diagram showing a hardware configuration of a computer apparatus 10 such as a notebook PC (notebook type personal computer) as an example of electrical equipment. In the computer apparatus 10 shown in FIG. 1, the CPU 11 functions as a brain of the entire computer apparatus 10, and executes various programs under control of an OS. This CPU 11 is interconnected to respective constituents through buses in three stages, which are: an FSB (Front Side Bus) 12 that is a system bus; a PCI (Peripheral Component Interconnect) bus 20 as a bus for high-speed I/O devices; and an LPC (Low Pin Count) bus 40 that is a new interface replacing an ISA bus. This CPU 11 stores program codes and data in a cache memory, thus achieving a speed increase in processing. In order to compensate for a shortage of capacity of a primary cash provided inside the CPU 11, a secondary cache 14 is sometimes placed through a BSB (Back Side Bus) 13 that is a dedicated bus. Note that, as the CPU 11, for the purpose of dealing with thermal destruction, it is possible to adopt one having functions, for example, of monitoring temperature thereof, performing throttling (automatically reducing its clock, that is, clocking down) when the temperature is abnormal (equal to a certain temperature or higher), stopping the clock when the temperature does not stop rising, and restarting the operation when the temperature is lowered.

The FSB 12 and the PCI bus 20 are linked with each other by a CPU bridge (Host-PCI Bridge) 15 called as a memory/PCI chip. This CPU bridge 15 is configured by including a memory control function for controlling an access operation to the main memory 16, a data buffer for absorbing a difference in data transfer rate between the FSB 12 and the PCI bus 20, and the like. The main memory 16 is a writable memory utilized as a read area for the programs executed by the CPU 11 or a work area into which data processed by the execution programs is written. The execution programs include the OS, various drivers for operating peripheral equipment and the like on hardware, application programs directed to specific tasks, and firmware such as a BIOS (Basic Input/Output System). A video subsystem 17 is a subsystem for realizing functions relating to video, and includes a video controller. This video controller processes a drawing command from the CPU 11 to write the processed drawing information into a video memory, and reads out this drawing information from the video memory to output the read drawing information as drawing data to a liquid crystal display (LCD) 18.

The PCI bus 20 is a bus capable of relatively high-speed data transfer. To this PCI bus 20, an I/O bridge 21, a cardbus controller 22, an audio subsystem 25, an docking station interface (Dock I/F) 26, and a miniPCI connector (slot) 27 are individually connected. The cardbus controller 22 is a dedicated controller for directly connecting bus signals of the PCI bus 20 to an interface connector (cardbus) of a card bus slot 23. It is possible to load a PC card 24 into this cardbus slot 23. The docking station interface 26 is hardware for connecting a docking station (not shown) that is a function expansion device of the computer apparatus 10 to the computer apparatus 10. When the notebook PC is set into the docking station, various hardware elements connected to an inner bus of the docking station are connected to the PCI bus 20 through the docking interface 26. Moreover a miniPCI card 28, building therein a wireless LAN module in this embodiment, is connected to the miniPCI connector 27. The miniPCI card 28 is an expansion card (board) that can be added in conformity with specifications of the miniPCI. This miniPCI is a standard for mobile equipment, and appears as an appendix in PCI Rev. 2.2 Specifications. The miniPCI is equivalent to a PCI with full specifications in terms of function.

The I/O bridge 21 includes a bridging function between the PCI bus 20 and the LPC bus 40. Moreover, the I/O bridge 21 includes a DMA controller function, a programmable interruption controller (PIC) function, a programmable interval timer (PIT) function, an IDE (Integrated Device Electronics) interface function, a USB (Universal Serial Bus) function, and an SMB (System Management Bus) interface function. Furthermore, the I/O bridge 21 builds a real time clock (RTC) therein. The DMA control function is a function for executing data transfer between the peripheral equipment such as an FDD and the main memory 16 without interposing the CPU 11 therebetween. The PIC function is a function for executing a predetermined program (interruption handler) in response to an interruption request (IRQ) from the peripheral equipment. The PIT function is a function for generating timer signals in a predetermined cycle. Furthermore, to an interface realized by the IDE interface, a CD-ROM drive 32 is connected in conformity with the ATAPI (AT Attachment Packet Interface) standard, while an IDE hard disk drive (HDD) 31 is also connected. Instead of this CD-ROM drive 32, an IDE device of other type, such as a DVD (Digital Versatile Disc) drive, may be connected.

Moreover, a USB port is provided in the I/O bridge 21, and this USB port is connected to a USB connector 30 provided, for example, on a wall surface and the like of the main body of the notebook PC. Furthermore, to the I/O bridge 21, an EEPROM 33 is connected through an SM bus. This EEPROM 33 is a memory for holding information such as a password registered by a user, a supervisor password, and a serial number of the product. The EEPROM 33 is nonvolatile and set capable of electrically rewriting a stored content. Moreover, to the I/O bridge 21, a plurality of connectors 47 are connected through the AC'97 (Audio CODEC '97) supporting a modem function, an LCI (LAN Connect Interface) for Ethernet (trademark), which is built in a core chip, a USB and the like. Each of the connectors 47 is configured such that a communication card 48 is connectable thereto. Furthermore, the I/O bridge 21 is connected to a power source circuit 50. The power source circuit 50 includes an AC adapter, a battery, a battery switch circuit which charges this battery (secondary battery) and switches power supply paths from the AC adapter and the battery, a DC/DC converter (DC/DC) which generates constant DC voltages of such as 5V and 3.3V for use in the computer apparatus 10, and the like.

The LPC bus 40 is an interface conforming to a standard for connecting a legacy device to a system which does not have the ISA bus. To this LPC bus 40, an embedded controller 41, a flash ROM 44, and a Super I/O controller 45 are connected. The LPC bus 40 is used also for connecting such peripheral equipment as keyboard/mouse controller which operate at relatively low speed. Moreover, a gate array logic 42 is connected to the embedded controller 41. To the Super I/O controller 45, an I/O port 46 is connected, through which drive of the FDD, input/output of parallel data (PIO) through a parallel port, and input/output of serial data (SIO) through a serial port are controlled. The embedded controller 41, which controls an un-illustrated keyboard, is connected to the power source circuit 50, and thus partially plays a role of a power source management function by a PMC (Power Management Controller) built therein.

Figure 2:
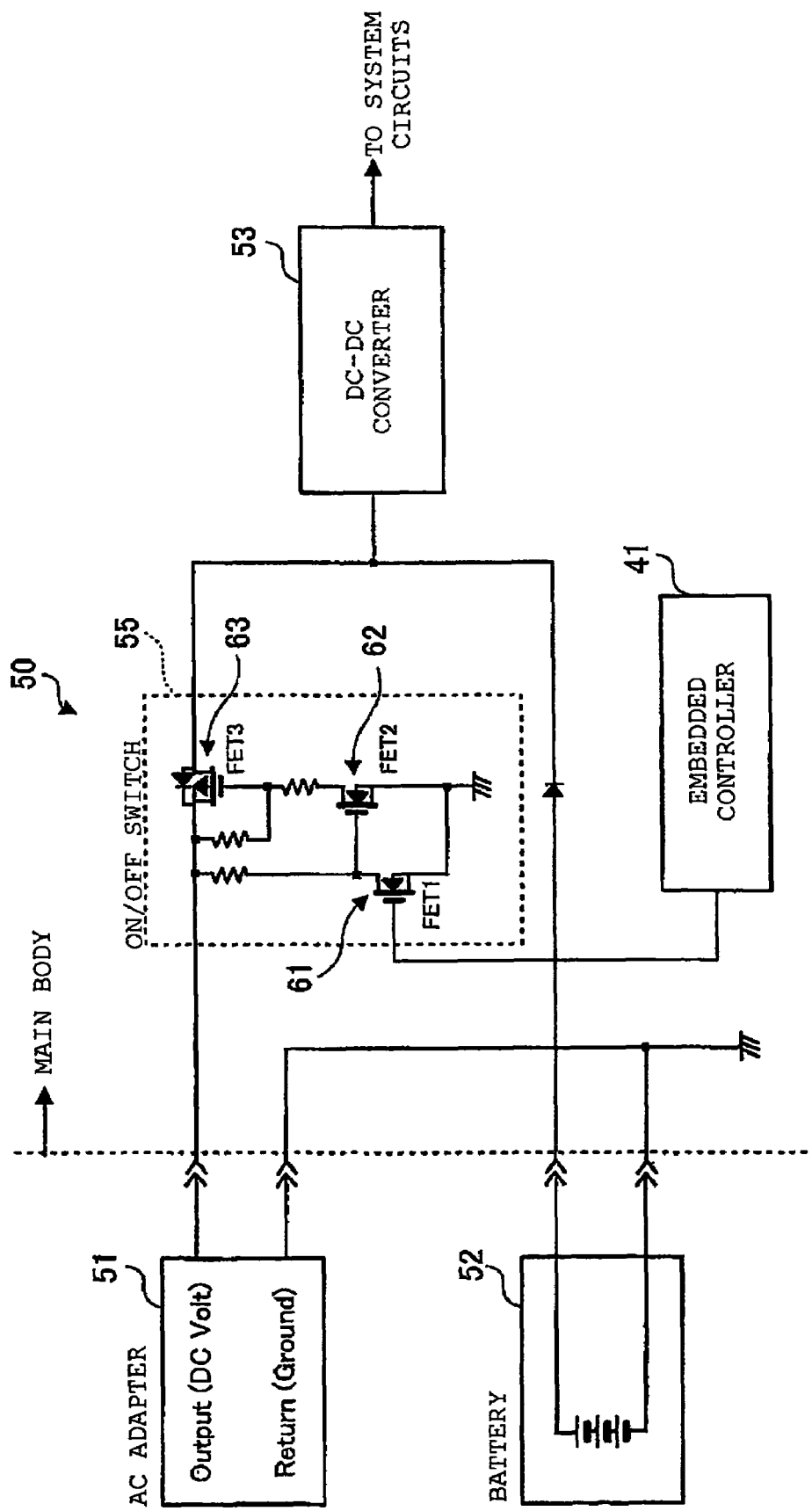
FIG. 2 is a diagram showing the entire configuration of a power supply system to which an embodiment of the present invention is applied.

FIG. 2 is a diagram showing the entire configuration of a power supply system to which this embodiment is applied. The power supply system shown in FIG. 2 includes an AC adapter 51 that is a power supply device (external power source) connected to a commercial power supply, and a battery 52 formed of, for example, an intelligent battery which has a CPU therein or a dumb battery which does not have a CPU therein. Moreover, the power supply system includes, in the main body thereof, a DC-DC converter 53 which generates DC voltages of such as +15V, +5V and +3.3V for use in a system circuit of the computer apparatus 10 upon receiving DC voltages from the AC adapter 51 and the battery 52. Furthermore, the power supply system includes an ON/OFF switch 55 that is a switch turning on/off a power line from the AC adapter 51 based on an instruction from the embedded controller 41.

The ON/OFF switch 55 includes a first FET (FET1) 61, a second FET (FET2) 62, and a third FET (FET3) 63, which are field effect transistors. When the output from the embedded controller 41 is set H (high), the first FET 61 is turned on, the second FET 62 is turned off, and the third FET 63 is turned off. Consequently, the power line from the AC adapter 51 is turned off, and the power from the battery 52 is supplied to the system circuit through the DC-DC converter 53. On the other hand, when the output from the embedded controller 41 is set L (low), the first FET 61 is turned off, the second FET 62 is turned on, and the third FET 63 is turned on. Consequently, the power line from the AC adapter 51 is turned on. The voltage of the AC adapter 51 is higher as compared with the voltage of the battery 52, and accordingly, when the power lines of the both are connected to the system circuit, the power is supplied from the AC adapter 51 through the DC-DC converter 53 to the system circuit.

Specifically, when both the AC adapter 51 and the battery 52 are connected to the main body of the system, the power is supplied from the AC adapter 51 to the system circuit because the voltage of the AC adapter 51 is higher as compared with the voltage of the battery 52. In general, it is only in a case where the AC adapter 51 is detached from the main body of the system or a path from the power source through the AC adapter 51 is blocked by the ON/OFF switch 55 that the battery 52 is used as a drive power source. Moreover, when the AC adapter 51 is connected to the main body, the battery 52 is automatically charged from the AC adapter 51 through a charge circuit (not shown).

Here, a measurement circuit for discharge power will be described.

In a system of this embodiment, which is to be described later, it is necessary to measure the power discharged from the battery 52. Accordingly, in this embodiment, a circuit for measuring the power is provided.

Figure 3:
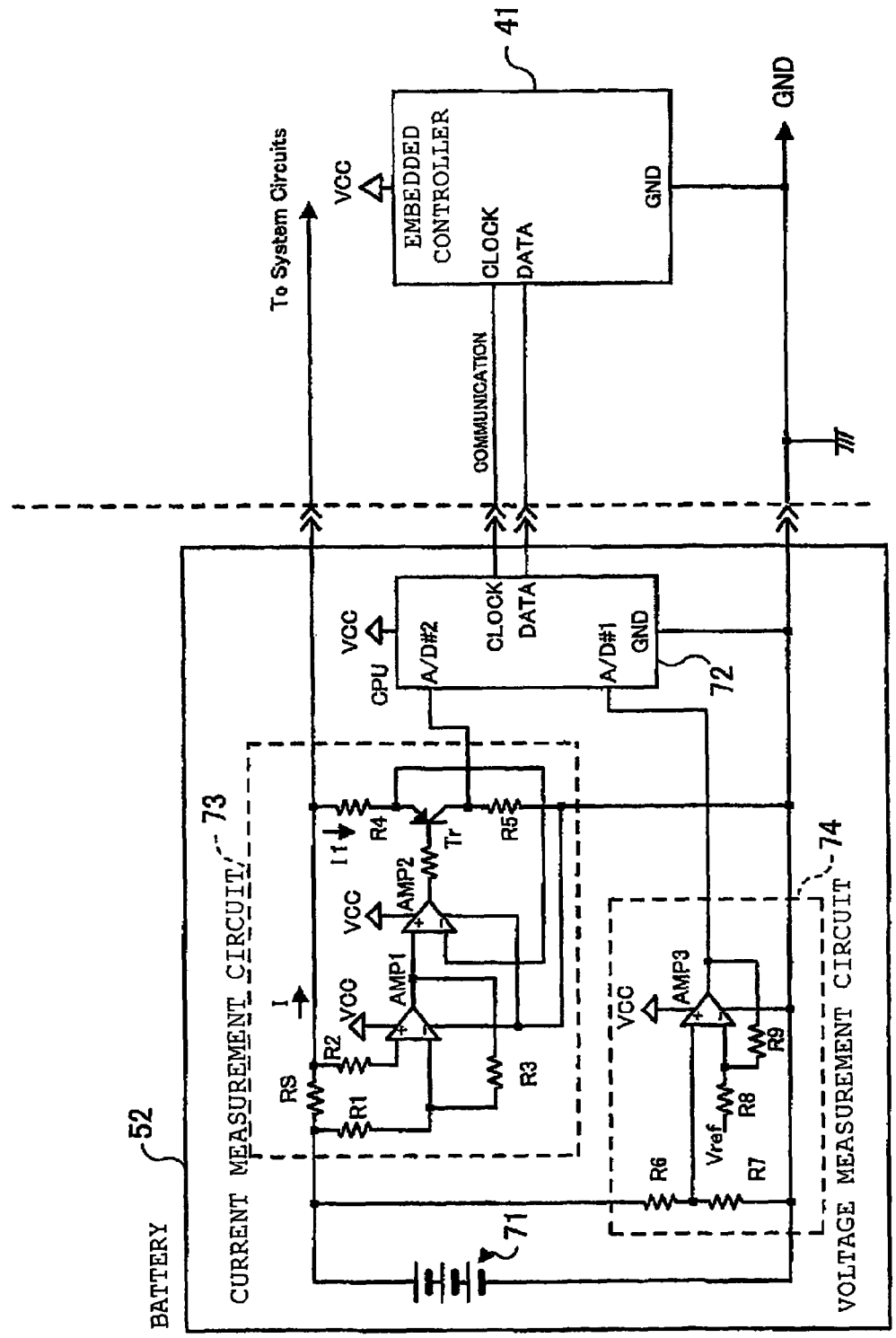
FIG. 3 is a diagram showing an example of a circuit for measuring power when a battery is an intelligent battery having a CPU therein.
Figure 4:
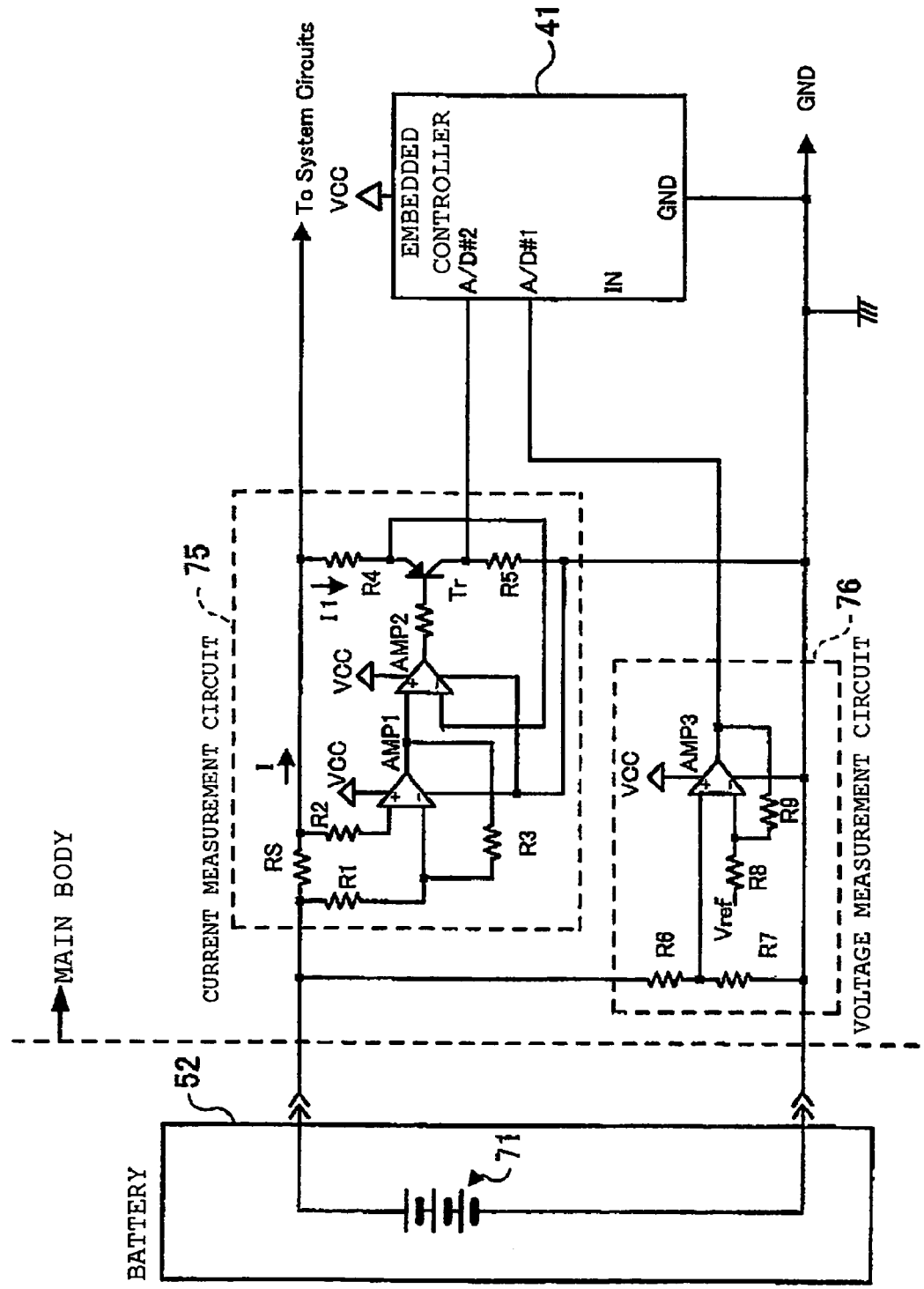
FIG. 4 is a diagram showing an example of a circuit for measuring power when the battery is not the intelligent battery but a so-called dumb battery.

FIGS. 3 and 4 are diagrams for explaining circuits for measuring the power in this embodiment. FIG. 3 gives an example of the case where the battery 52 is the intelligent battery which has the CPU therein. FIG. 4 gives an example of the case where the battery 52 is not the intelligent battery but the so-called dumb battery. In the case of providing the circuit for measuring the power, it is satisfactory if either one of the circuits shown in FIGS. 3 and 4 is applied.

As shown in FIG. 3, when the battery 52 is the intelligent battery, for example, the battery 52 conforms to the SBS (Smart Battery System), and achieves a predetermined communication with the embedded controller 41. The battery 52 shown in FIG. 3 includes a cell (battery cell) 71 composed of a plurality of single cells, which serves as charging and discharging batteries, a CPU 72 which controls the battery 52 and communicates with the embedded controller 41, a current measurement circuit 73 as a circuit for the power measurement, which measures a value of current discharged from the cell 71, and a voltage measurement circuit 74 which obtains voltage of the cell 71. For example, the cell 71 is a lithium-ion battery pack composed of six cells with two cells in parallel and three cells in series (1.8 Ah/cell).

In the current measurement circuit 73, first, a current difference obtained by multiplying a current I by a resistance RS is generated on both ends of a resistor (RS) by the current I flowing from the cell 71. This voltage is differentially amplified by an operational amplifier (AMP1). Moreover, a current I1 proportional to an output voltage of the operational amplifier (AMP1) flows through a resistor (R4) by an operational amplifier (AMP2) and a transistor (Tr). Finally, the value of the current I of the battery 52 can be converted into a voltage (I1×R5) generated in a resistor (R5). This voltage (I1×R5) is inputted to an A/D#2 port of the CPU 72 and subjected to A/D conversion by the CPU 72.

Meanwhile, in the voltage measurement circuit 74, the voltage of the cell 71 in the battery 52 is differentially amplified and converted by an operational amplifier (AMP3). Then, the converted voltage is inputted to an A/D#1 port of the CPU 72.

The CPU 72 performs, in the inside thereof, the A/D (Analog to Digital) conversion on analog signals that are measurement results inputted from the current measurement circuit 73 and the voltage measurement circuit 74, and grasps the current and voltage values from the cell 71. Moreover, the CPU 72 grasps various kinds of information regarding the cell 71, such as a capacity of the cell 71. Through two communication lines (SM buses), which are DATA and CLOCK, the various kinds of information such as the grasped current and voltage values are transmitted to the embedded controller 41 of the system from the CPU 72 of the battery 52 by use of an SBS protocol. By the processing above, the embedded controller 41 can grasp the current and voltage values of the battery 52. The discharge power from the battery 52 can be measured by multiplying these grasped values.

In contrast, when the battery 52 is the dumb battery, as shown in FIG. 4, a current measurement circuit 75 and a voltage measurement circuit 76, which are the circuits for measuring the power, are provided on input lines of the systems outside the battery 52. In the current measurement circuit 75, first, a current difference obtained by multiplying a current I by a resistance RS is generated on both ends of a resistor (RS) by the current I flowing from the cell 71 of the battery 52. This voltage is differentially amplified by an operational amplifier (AMP1). Moreover, a current 11 proportional to an output voltage of the operational amplifier (AMP1) flows through a resistor (R4) by an operational amplifier (AMP2) and a transistor (Tr). Finally, the value of the current I of the battery 52 can be converted into a voltage (I1×R5) generated in a resistor (R5). This voltage (I1×R5) is inputted to an A/D#2 port of the embedded controller 41.

Meanwhile, in the voltage measurement circuit 76, the voltage of the battery 52 is differentially amplified and converted by an operational amplifier (AMP3). Then, the converted voltage is inputted to an A/D#1 port of the embedded controller 41.

The embedded controller 41 can measure the discharge power from the battery by multiplying the current value measured in the current measurement circuit 75 and the voltage value measured in the voltage measurement circuit 76.

Next, a power supply method when a peak shift function is applied, which is a characteristic configuration in this embodiment, will be described.

For example, during an afternoon in midsummer, in a time period while peak power should be reduced, that is, a time period while a demand for the power is extremely high, it is desired that the power be supplied from the battery 52 as much as possible, and that the power supply from the AC adapter 51, that is the power supply source to be reduced as much as possible. In a usual peak shift operation, on a day that consumption of power staffs to be increased, for example two o'clock in the afternoon may become a first time and the third FET 63 of the ON/OFF switch 55 is turned off to stop the power supply from the AC adapter 51, and instead, the battery 52 starts to discharge. For example, four o'clock in the afternoon may become a second time and the third FET 63 of the ON/OFF switch 55 is turned on to stop the power supply from the battery 52, and the main body is driven by the power of the AC adapter 51. At this time the battery 52 which has reduced its capacity is charged.

Figure 5:
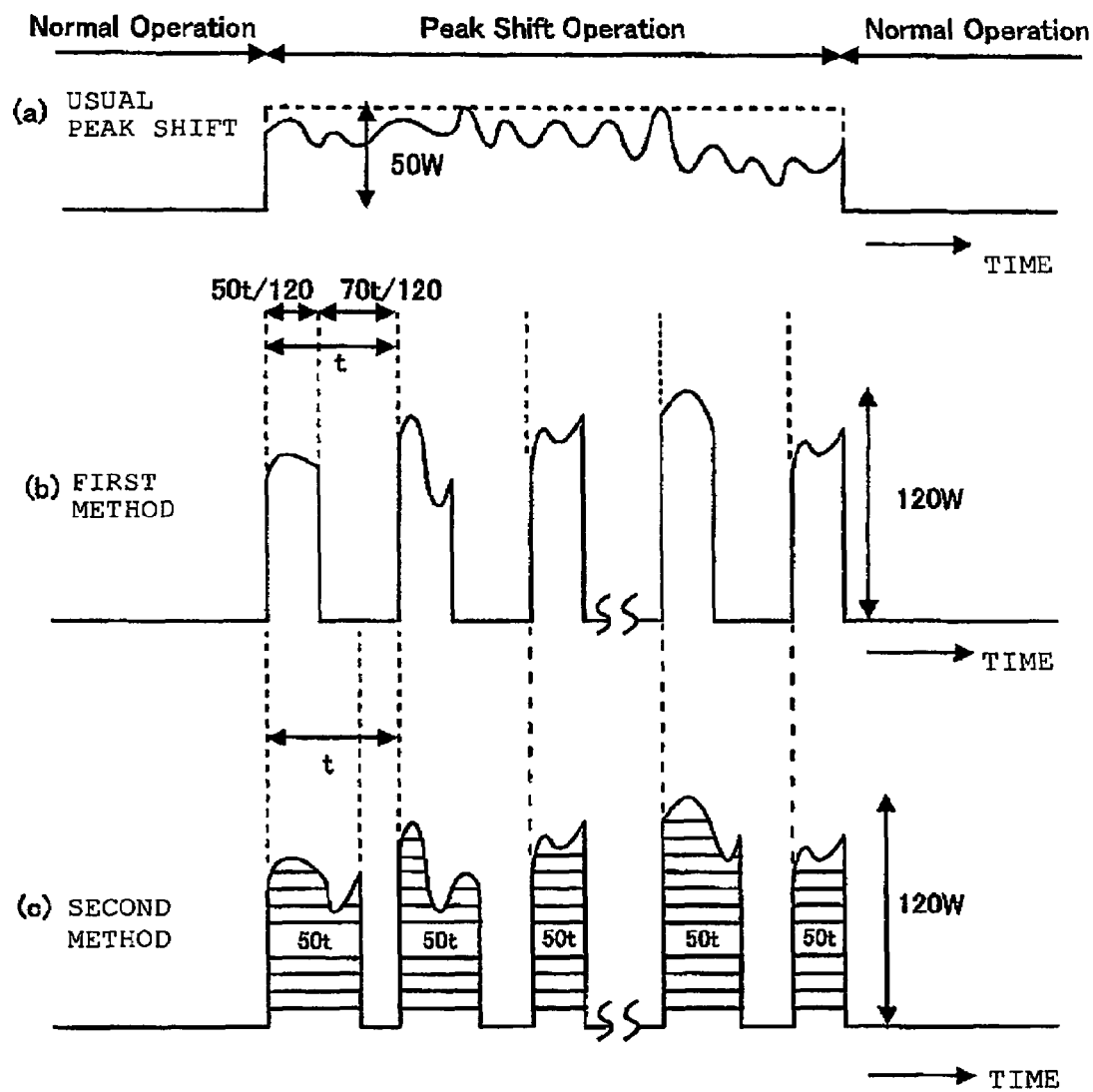
FIGS. 5(a) to 5(c) are charts for explaining a principle of a power supply method in the embodiment.

FIGS. 5(a) to 5(c) are charts for explaining a principle of the power supply method in this embodiment. FIG. 5(a) illustrates a conventional normal peak shift operation. FIG. 5(b) illustrates a first method in this embodiment, and FIG. 5(c) illustrates a second method therein. The first method illustrated in FIG. 5(b) is an example simply implemented, and the second method illustrated in FIG. 5(c) is a more preferred embodiment. In each of the charts, a horizontal axis represents time, and a vertical axis represents power consumption of the main body of the system (system). Here, it is assumed that the maximum power consumption of the system is 120 W and that possible continuous discharge power of the battery 52 is 50 W. The possible continuous discharge power of the battery 52 is determined based on temperature rise data of the respective components in the battery 52. In the event of applying this embodiment, in a predetermined notebook PC to be measured, a temperature rise in the cell 71 was measured in the case where power of 60 W was discharged from the battery 52 at an environmental temperature of 40° C. It was possible to control the temperature within a relatively gentle rise when power of 50 W started to be discharged from a state of a discharge of 0 W (no discharge) immediately after the start of the discharge. Therefore, here, the possible continuous discharge power of the battery 52 is assumed to be 50 W. Note that, in an actual measurement in the notebook PC, a large difference in temperature is not seen even if discharge is performed with average power of 60 W.

In the conventional method shown in FIG. 5(a), it is 50 W that can be continuously discharged from the battery 52. Accordingly, during a peak shift period (while the system is being driven by the battery), a power management operation is performed such that the power does not exceed 50 W even if the system operates to the maximum extent. For example, a throttling operation for reducing performance of the system to 41.7% or lower is performed, and thus the power consumption can be controlled to 50 W or less. However, the system performance during this peak shift period is reduced to 41.7% or lower. Therefore, in this embodiment further described below, it is contrived that the system operates without reducing the performance thereof.

The first method illustrated in FIG. 5(b) is configured so as not to perform power control by the throttling and the like for automatically clocking down the CPU 11 even while the system is being driven by the battery 52 at the peak shift. In the method illustrated in FIG. 5(b), the peak shift period is delimited by a cycle t, and among the delimited sections, the system is driven by the battery 52 for a time of 50t/120 (5/12), and driven by the AC adapter 51 for a time of 70t/120 (7/12). Although the drive by the battery 52 and the drive by the AC adapter 51 are alternately switched during the peak shift period, the power control by the throttling and the like is not performed even while the battery 52 is operating. More concretely, when a cycle is set at 12 seconds, an operation of driving the system by the battery 52 for five seconds of the 12 seconds and by the AC adapter 51 for seven seconds of the 12 seconds is repeated. Although the maximum peak discharge power of the battery 52 reaches 120 W as a result of this, average discharge power can be reduced to be less than 50 W, and accordingly, the battery 52 can meet specifications thereof. Because the throttling is not performed even during the peak shift period, it is made possible to fully operate the system by such control.

Similarly to the first method, the second method illustrated in FIG. 5(c) is configured so as not to perform the power control by the throttling and the like even while the system is being driven by the battery 52 at the peak shift. Here, while the system is being driven by the battery 52 for the peak shift period, the fluctuating power consumption of the system is detected, and the amount of power is summed up. Such a summation of the amount of power is executed by the embedded controller 41 in the circuit shown in FIG. 3 or 4. When the amount of power reaches 50t as a result of the summation thereof, the system is driven by the AC adapter 51 for the rest of time in the cycle t. As a result, though the maximum peak discharge power of the battery 52 reaches 120 W, the average discharge power can be controlled to 50 W, and accordingly, the battery 52 can meet the specifications thereof. Because the throttling is not performed even during the peak shift period, it is made possible to fully operate the system by such control. Furthermore, as compared with the first method, the power from the battery 52 can be sufficiently utilized, and accordingly, the peak shift function can be strengthened more than the conventional one.

Note that, according to the actual measurement in the notebook PC by the inventors, it has become apparent that no problem occurs even if the time (cycle) t illustrated in FIGS. 5(b) and 5(c) is approximately two to three minutes. However, for the purpose of strengthening safety against the temperature rise of the battery 52 for use in the other devices, it is preferable to set the cycle t in a range of 30 to 60 seconds and to alternately switch between the battery 52 and the AC adapter 51 in such a cycle. Moreover, if the drive by the battery and the drive by the AC adapter, which are illustrated in FIG. 5(b), are alternately switched in the cycle of 12 seconds, for example, such that the system is driven by the battery for five seconds in the cycle, the average discharge power by the battery 52 is lowered to 50 W or less. From a viewpoint of the temperature rise of the battery, this case is equivalent to that the power management function is operated to control the performance of the system at 41.7%. These methods illustrated in FIGS. 5(b) and 5(c) can be realized by software installed in the computer apparatus 10.

Figure 6:
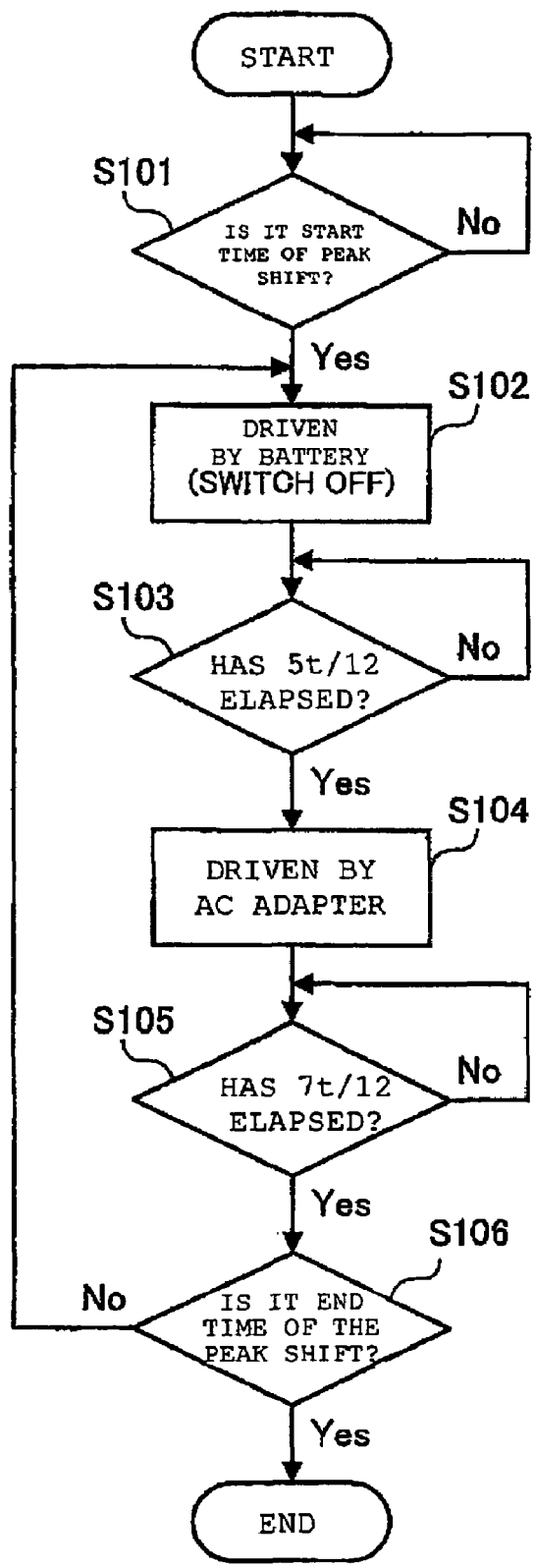
FIG. 6 is a flowchart showing processing for executing a first method illustrated in FIG. 5(b).

FIG. 6 is a flowchart showing processing for executing the first method illustrated in FIG. 5(b). In the embedded controller 41, first, it is determined whether or not the start time of the peak shift as the first time (for example, two o'clock in the afternoon) has come (Step 101). When the start time has not come yet, the time is awaited. When the start time has come, as first switching means, the ON/OFF switch 55 is turned off, and the power line from the AC adapter 51 is turned off. Thus, the power source circuit 50 receives a supply of the power from the battery 52 (Step 102). Thereafter, the embedded controller 41 performs processing as third switching means that is means for switching the power supply source during the peak shift period. Specifically, it is determined whether or not 5t/12 that is the predetermined period while the system is being driven by the battery has elapsed with respect to the above-described cycle t (Step 103). When 5t/12 has not elapsed yet, the drive by the battery is maintained as it is. When 5t/12 has elapsed, the ON/OFF switch 55 is turned on, and the power line from the AC adapter 51 is turned on. Thus, the supply of the power from the AC adapter 51 is received (Step 104). Thereafter, it is determined whether or not 7t/12 that is a predetermined period while the system is being driven by the AC adapter has elapsed with respect to the above-described cycle t (Step 105). When 7t/12 has not elapsed yet, the drive by the AC adapter is maintained as it is. When 7t/12 has elapsed, it is determined whether or not an end time of the peak shift (for example, four o'clock in the afternoon) has come (Step 106). When the end time that is a second time) has not come yet, the processing from Step 102 is repeated. When the end time has come, as second switching means, the ON/OFF switch 55 is turned on, and the processing ends.

Figure 7:
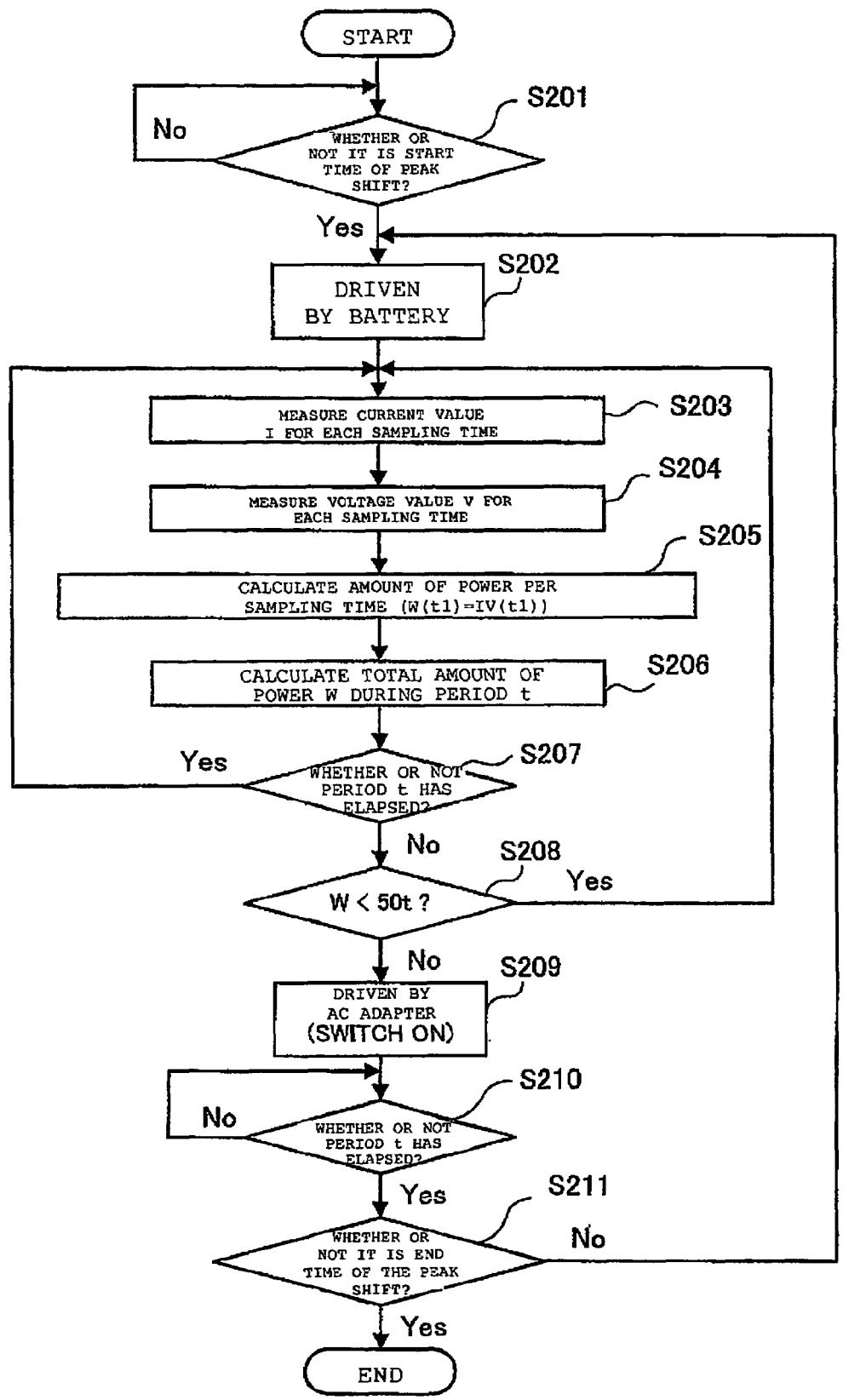
FIG. 7 is a flowchart showing processing for executing a second method illustrated in FIG. 5(c).

FIG. 7 is a flowchart showing processing for executing the second method illustrated in FIG. 5(c). In the embedded controller 41, first, it is determined whether or not the start time of the peak shift as the first time (for example, two o'clock in the afternoon) has come (Step 201). When the start time has not come yet, the time is awaited. When the start time has come, as first switching means, the ON/OFF switch 55 is turned off, and the power line from the AC adapter 51 is turned off. Thus, the power source circuit 50 receives a supply of the power from the battery 52 (Step 202). Thereafter, the embedded controller 41 performs processing, as third switching means that is means for switching the power supply source during the peak shift period. Specifically, the embedded controller 41 measures (acquires) the current value I for each sampling time, which is obtained by the current measurement circuit 73 inside the battery 52 based on a communication from the CPU 72 inside the battery 52, which is illustrated in FIG. 3. Alternatively, the embedded controller 41 measures the current value I for each sampling time by use of the current measurement circuit 75 of the system, which is illustrated in FIG. 4 (Step 203). Moreover, the embedded controller 41 measures (acquires) the voltage value V for each sampling time, which is obtained by the voltage measurement circuit 74 inside the battery 52 based on the communication from the CPU 72 inside the battery 52, which is illustrated in FIG. 3. Alternatively, the embedded controller 41 measures the voltage value V for each sampling time by use of the voltage measurement circuit 76 of the system, which is illustrated in FIG. 4 (Step 204).

Then, the embedded controller 41 calculates the amount of power W(t1) per sampling time (t1), which is equal to I×V(t1), by use of the measured current and voltage values (Step 205). Then, the total amount of power W in the period t is calculated from the amount of power W(t1) per sampling time (t1) (Step 206). Thereafter, it is determined whether or not the period t has elapsed (Step 207). When the period has elapsed, the process returns to Step 203, and similar processing is repeated. When the period has not elapsed yet, it is determined whether or not the total amount of power W has reached 50t (Step 208). When the total amount has not reached 50t yet, the process returns to Step 203, the above-described processing is repeated while further continuing the drive by the battery, and another total amount of power is newly calculated for another period added with a predetermined sampling time. When the total amount of power has reached 50t, the ON/OFF switch 55 is turned on, the power line from the AC adapter 51 is turned on, and the supply of the power is received from the AC adapter 51 (Step 209). Thereafter, it is determined whether or not the above-described cycle (period) t has elapsed (Step 210). When the cycle t has not elapsed yet, an elapse of the cycle t is awaited. When the cycle t has elapsed, it is determined whether or not the end time of the peak shift as the second time (for example, four o'clock in the afternoon) has come (Step 211). When the end time has not come yet, the processing from Step 202 is repeated. When the end time has come, as the second switching means, the ON/OFF switch 55 is turned on, and the processing thus ends.

As described above in detail, in this embodiment, the switch (ON/OFF switch 55) for turning on/off the power line of the AC adapter 51 is composed of the FETs in the inside of the system in order to realize the peak shift function. In the usual peak shift operation, when the daytime that consumption power starts to be increased, for example, two o'clock in the afternoon, comes as the first time, the switch is turned off to stop the power supply from the AC adapter 51, and instead, the battery 52 starts to discharge. Meanwhile, when four o'clock in the evening comes as the second time, the switch is turned on to stop the power supply from the battery 52, and the main body is driven by the power of the AC adapter 51. Moreover, in this case, the battery 52 which has reduced its capacity is charged. In this case, the power is supplied from the battery 52 during the peak shift period between the first time and the second time. However, when the system is fully operated at this time, the power consumption of the system exceeds, for example, 100 W. When the battery 52 continues to discharge power corresponding to such consumption, the temperature thereof rises greatly to exceed allowable temperature. There is a possibility that such a state may bring deterioration of the battery 52 and cause a problem on safety. Therefore, in the usual equipment, during the peak shift period, the throttling operation (operation of virtually dropping the clock frequency) of the CPU, and the SpeedStep that is a power saving technology for a high-performance notebook personal computer, which is developed by Intel Corporation in the United States, are executed. Thus, the performance of the system is reduced, and the power consumption of the system is controlled to approximately 50 W or less. However, in this embodiment, without reducing the performance of the system, the power supply source is alternately switched between the battery 52 and the AC adapter 51 while the battery 52 and the AC adapter 51 are repeatedly being turned on/off plural times during the peak shift period. Thus, the average discharge power of the battery 52 can be controlled within 50% or 37%. That is, even during the peak shift period, it is made possible to drive the main body of the system at full speed without reducing the performance of the system. Moreover, it is also made possible to maintain the peak shift period (period while the system is being driven by the battery) for a period equal to the conventional one.

As examples to which the present invention is applied, in addition to a computer apparatus such as a notebook PC, electrical equipment or the like to which an external power source and a battery are connectable is given.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
    a main body which consumes power;
    an external power source which supplies power to said main body provided by a commercial power source;
    a battery which discharges to supply power to said main body; and
    a controller coupled to said external power source and said battery and which alternately switches a power supply source for the main body between the battery and the external power source during a predetermined period of time.

2. Apparatus according to claim 1, wherein the predetermined period is a period while power supplied from said external power source is limited.

3. Apparatus according to claim 1, wherein said controller switches between said battery and said external power source in a certain cycle repeated during the predetermined period.

4. Apparatus according to claim 1, wherein said controller calculates an amount of power supplied to the main body by said battery in a certain cycle repeated during the predetermined period, and switches power supply sources for the main body from said battery to said external power source based on the calculated amount of power.

5. Apparatus comprising:
    a first switch which turns off the power supplied from an external power source to supply power to a main body from a battery in response to reaching a first time, wherein the external power source supplies power to the main body from a commercial power source and the battery discharges to supply power to the main body;
    a second switch which turns on the power supplied from the external power source to supply power to the main body from the external power source in response to reaching a second time after the first time; and
    a third switch which repeats the turning off/on of the power supplied from the external power source to the main body a plurality of times during a period between the first time and the second time while the external power source and the battery are connected to the main body.

6. Apparatus according to claim 5, wherein the third switch executes the turning off/on of the power supplied from the external power source during a predetermined cycle.

7. Apparatus according to claim 6, wherein the third switch turns on the power supplied from the external power source based on a total amount of power determined on a basis of allowable temperature of the battery.

8. Apparatus, comprising:
    a main body of a system having a function of reducing performance of the system to operate;
    an AC adapter which is configured to be connectable to said main body of the system and supplies power to said main body of the system from a provided commercial power source; and
    a battery which is configured to be connectable to said main body of the system and discharges to supply power to said main body of the system after being charged,
    wherein said apparatus operates the system without reducing the performance of the system even while supply of power from said AC adapter is turned off and power is supplied from said battery during a period, during which period the supply of power from said AC adapter is limited, in a state where both said AC adapter and said battery are connected to said main body of the system, and thereafter, supply of power from said AC adapter is turned on and power is supplied to the main body of the system from said AC adapter even during the period.

9. Apparatus according to claim 8, wherein power supplied from said battery and power supplied from said AC adapter are switched during a predetermined cycle in the period.

10. Apparatus according to claim 9, wherein a total amount of power discharged from the battery during the cycle is calculated, and the supply of power is switched to the power supplied from said AC adapter before the total amount of power exceeds an amount of power determined based on specifications of said battery.

11. A method comprising:
   (a) stopping, in response to reaching a first time, a supply of power from an external power source to supply power from a battery, wherein power is supplied to electrical equipment to which both the external power source and the battery are connected, the external power source supplies power from a provided commercial power source, and the battery discharges to supply power;
   (b) holding a power state in which power is supplied from the battery after the first time; and
   (c) switching to the power supplied from the external power source on condition that the power supplied from the battery reaches a predetermined state;
   wherein said holding (b) and said switching (c) are repeated in a predetermined cycle.

12. The method according to claim 11, wherein in said stopping (a), performance of a system of the electrical equipment is not reduced while power is supplied from the battery.

13. The method according to claim 11, wherein the predetermined state is an elapse of time obtained by delimiting the predetermined cycle by a predetermined ratio.

14. The method according to claim 11, wherein the predetermined state is a summed value of amounts of power discharged from the battery.

15. A product comprising:
   a computer usable medium having computer readable program code stored therein for controlling the source of power to a computer which is configured such that an external power source supplying power from a provided commercial power source and a battery discharging to supply power to the system are connectable thereto, the computer readable program code in said product being effective to:
   turn off the power supplied from the external power source to supply power to the system from the battery in response to reaching a first time;
   turn on the power supplied from the external power source to supply power to the system from the external power source in response to reaching a second time after the first time; and
   repeat the turning off/on of the power supplied from the external power source to the system a plurality of times during a period between the first time and the second time.

16. The product according to claim 15, wherein the code is further effective to operate the system without reducing performance of the system while the external power source is turned off and power is supplied from the battery to the system.

17. The product according to claim 15, wherein said repetition is executed such that the turning off/on for each of the plurality of times occurs in accordance to criteria selected from the group consisting of a predetermined cycle and to control, at a predetermined value, average discharge power from the battery in the cycle.

18. A product comprising:
   a computer usable medium having computer readable program code stored therein for controlling the supply of power of a computer which is configured such that an external power source supplying power to the computer from a provided commercial power source and a battery discharging to supply power to the system are connectable thereto, the computer having a function of operating with usual performance while power is supplied from the external power source to the computer and reducing performance of the computer when the external power source is not connected to the computer and power is supplied from the battery to the system, the computer readable program code in said product being effective to:
   turn off, in a state where the external power source is connected to the computer, the power supplied from the external power source to supply power from the battery to the system, and operate the system with the usual performance without reducing the performance of the system; and
   turn on the power supplied after turning off the power supplied from the external power source during a predetermined period in a certain cycle to supply power from the external power source to the system.

* * * * *